J. J. WILSON.
APPARATUS FOR REMOVING GASES FROM WATER.
APPLICATION FILED FEB. 24, 1921.
1,387,748.
Patented Aug. 16, 1921.
2 SHEETS—SHEET 1.
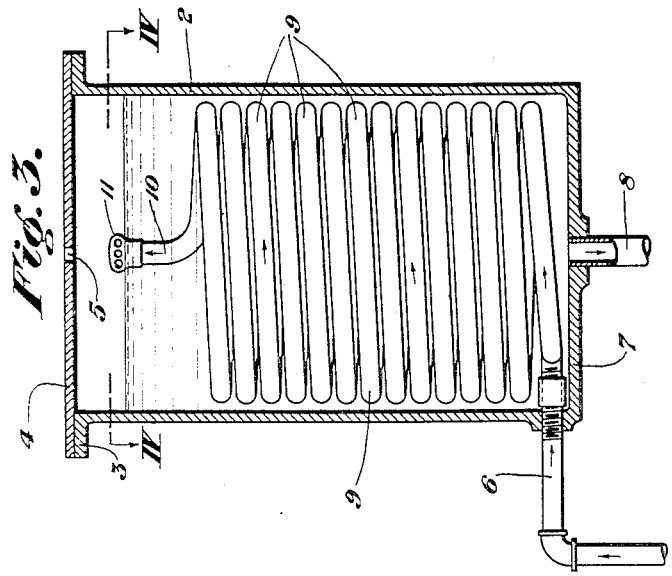
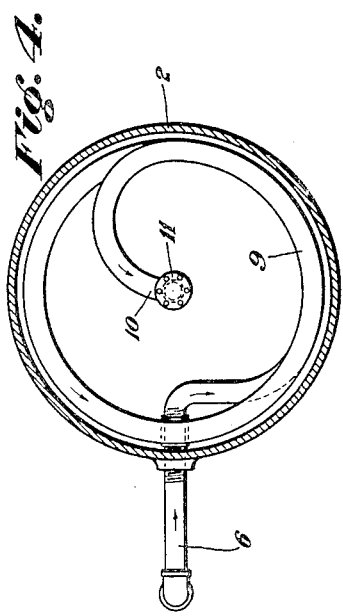
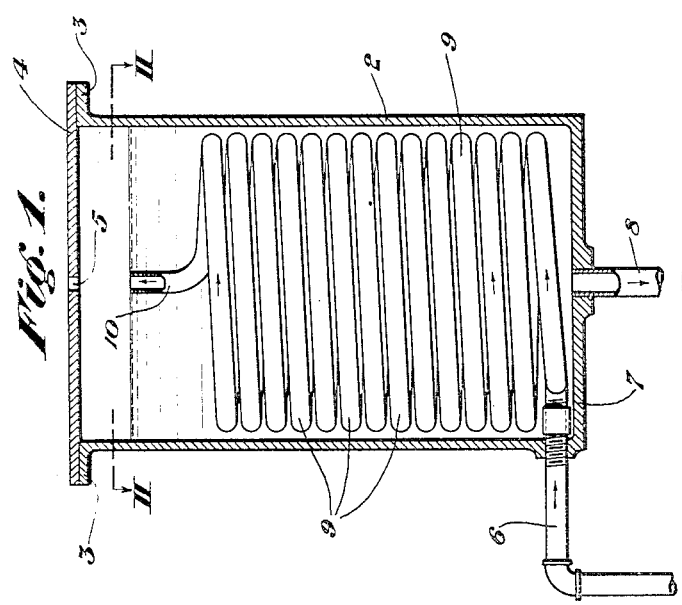
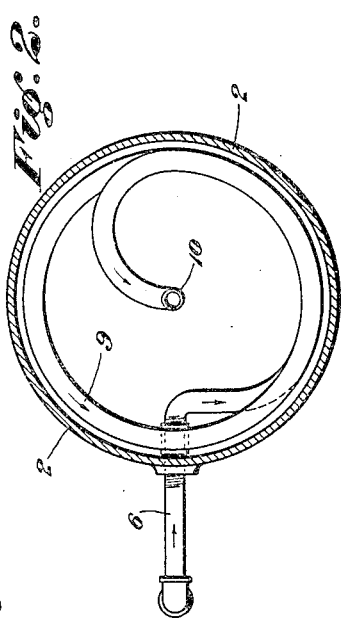
Witnesses:
Edwin Trueb
Inventor:
John J. Wilson.
by D. Anthony Usina
Attorney

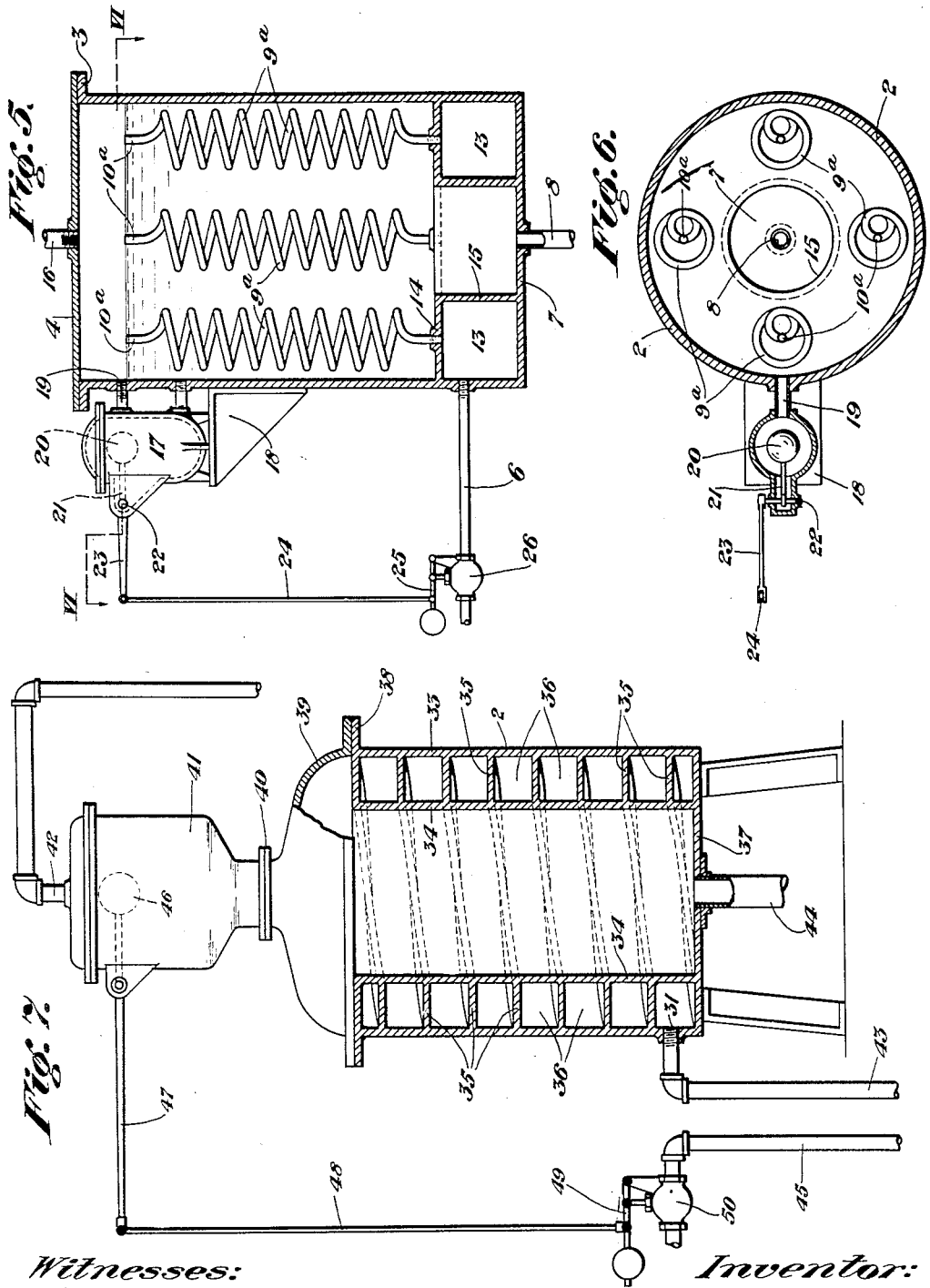

UNITED STATES PATENT OFFICE.

JOHN J. WILSON, OF McKEESPORT, PENNSYLVANIA, ASSIGNOR TO ANTI CORROSION ENGINEERING COMPANY, OF NEW YORK, N. Y., A CORPORATION OF NEW YORK.

APPARATUS FOR REMOVING GASES FROM WATER.

1,387,748.  Specification of Letters Patent.  Patented Aug. 16, 1921.

Application filed February 24, 1921. Serial No. 447,542.

*To all whom it may concern:*

Be it known that I, JOHN J. WILSON, a citizen of the United States, and resident of McKeesport, in the county of Allegheny and State of Pennsylvania, have invented certain new and useful Improvements in Apparatus for Removing Gases from Water, of which the following is a specification.

My invention relates to the separation from water or similar liquid of the dissolved oxygen or other corrosive gases contained therein.

One object of the invention is the provision of apparatus having novel means whereby the oxygen and other corrosive gases are mechanically segregated and removed from the water introduced into the apparatus.

Another object of my invention is the provision of apparatus having improved means for separating dissolved oxygen and similar corrosive gases from hot water, whereby the separation is effected under low pressure and the removal of the gases thereby facilitated.

Another object of the invention is to provide novel apparatus wherein the dissolved corrosive gases in water and similar liquids are separated from the water and collected by the combined action of capillary attraction and centrifugal force in the removal thereof from the water.

A further object of the invention is the provision of improved apparatus wherein the dissolved oxygen and other corrosive gases in heated water and similar liquids are removed by differential pressure, during circulation of the water.

Still further objects of my invention will be made apparent by reference to the drawings and detailed description thereof, and to the appended claims forming part of this specification.

Referring now to the drawings, forming part of this specification, Figure 1 is a sectional elevation showing one form of apparatus made in accordance with my invention.

Fig. 2 is a sectional plan taken on the line II—II of Fig. 1.

Fig. 3 is a sectional elevation, similar to Fig. 1, showing a modified form of my improved apparatus.

Fig. 4 is a sectional plan of the apparatus of Fig. 3, the section being taken on the line IV—IV of Fig. 3.

Fig. 5 is a sectional elevation similar to those of Figs. 1 and 3, showing another modification embodying my invention.

Fig. 6 is a sectional plan of the apparatus of Fig. 4, the section being taken on the line VI—VI of Fig. 5.

Fig. 7 is a sectional elevation similar to Figs. 1, 3, and 5, showing a further modification of my improved apparatus.

In the constructions shown in Figs. 1 and 2, the numeral 2 designates a vessel forming a separation tank, which has a flange 3 on its upper end to which a top or cover 4 is removably secured. The cover 4 has one or more perforations therein forming a vent 5 for the escape from the tank of the corrosive gases as they become separated from the water or other liquid entering the tank 2. An inlet in the lower side wall of the tank is connected to the discharge end of a liquid supply pipe 6, the other end of the pipe 6 being connected to a source of liquid supply. An outlet in the tank's bottom 7 is connected to the inlet end of a discharge pipe 8 through which the treated water or liquid flows to a place of use.

Positioned within the tank 2 is a helical pipe coil 9 forming a highly important feature of my invention. This coil has an outer diameter slightly less than the inner diameter of the tank 2, and is connected at its lower end to the inlet pipe 6, by which the liquid to be treated is supplied to the tank 2. The upper end 10 of the helical coil 9, which is open, terminates at about the liquid level maintained in the tank 2, the flow of the liquid supply to the tank being regulated by a suitable valve on the supply pipe 6, and the flow of the treated liquid from the tank being controlled by a valve on the discharge or outlet pipe 8.

The apparatus of Figs. 3 and 4 is very similar to that of Figs. 1 and 2, the vessel 2 having a flange 3 to which the head or cover 4 is detachably fastened, and the head 4 being perforated to form a vent 5. The tank inlet is connected to a supply pipe 6 and the tank bottom 7 has an outlet connected to a liquid discharge pipe 8, in the same way as in Figs. 1 and 2. The tank is provided with a helical pipe coil 9 whose lower end is connected to the supply pipe 6 and whose upper end terminates at about the level of the liquid in the tank 2. The apparatus of Figs. 3 and 4 differs from that of Figs. 1 and 2 only in having a "rose" or perforated spray head 11 on the upper end of the pipe coil 9, so as to spray or atomize the fluid at the point where it enters the tank 2.

In the further modification illustrated in Figs. 5 and 6, the vessel forming the separation tank is of somewhat different construction, the bottom of this tank having an annular distributing chamber 13, formed by the partitions 14 and 15, into which the fluid supply pipe discharges.

In this apparatus a plurality of small helical coils 9ª are used instead of a single large coil, the lower end of these coils 9ª being connected to the distributing chamber 13, and the upper end opening into the tank 2 at about the level the liquid is maintained in the tank.

The discharge or outlet pipe 8 is connected to the tank bottom 7, and a flange 3 is provided on the upper end of the tank to detachably fasten the head or cover 4 in place in the same way as in the apparatus of the preceding figures.

The vent 5 in the head 4 is connected to a pipe 16 which may open into the atmosphere, but which preferably will be connected with a vacuum producing apparatus (not shown) so as to maintain a partial vacuum in the tank 2.

The apparatus of Figs. 5 and 6 is also provided with a float chamber 17 which is mounted on a supporting bracket 18 secured on the side of the tank 2. The float chamber 17 is connected by a pipe 19 to the upper end of the tank 2 at the liquid level maintained therein. This float chamber has a float 20 therein connected by the lever 21, shaft 22 and lever 23 to one end of the connecting rod 24, and the lower end of the rod 24 is connected to the operating lever 25 of a valve 26 on the fluid supply pipe 6, so that the float 20 will regulate and control the flow of liquid into the tank 2 and maintain the liquid at a substantially constant level therein.

The apparatus of Fig. 7 is of a somewhat different construction from that of the preceding figures. The separation tank or vessel 2 is preferably formed of cast metal and is composed of double annularly spaced side walls 33 and 34, with an integrally formed horizontal wall 35, arranged spirally between the side walls and forming a substantially rectangular continuous or coil-like conduit 36, extending from the bottom to the top of the tank.

The tank is provided with an integral bottom 37 and a flange 38 on its upper end, to which a top or cover 39 is removably secured. The cover 39 has a centrally arranged aperture therein surrounded by flange 40, to which a vacuum separating tank or chamber 41 is secured. The tank or chamber 41 forms an extension of the main tank and has an aperture or vent in its top connected to a pipe 42, which is preferably connected with a vacuum producing apparatus (not shown) so as to maintain a partial vacuum within the separating tank.

In this apparatus, hot water or other liquid enters through an inlet 31 in the lower side wall of the tank which communicates with the lowest point of the passage 36 and is connected to the discharge end of a hot liquid supply pipe 43. An outlet in the tank bottom 37 is connected to the inlet end of a discharge pipe 44 through which the treated water or liquid flows to a place of use.

The liquid supply pipe 43 is connected to a heater (not shown) and cold liquid is supplied to the heater from a suitable source (not shown) through a pipe 45.

The apparatus of Fig. 7 also is provided with a float 46 within the tank 41 connected by a lever 47 to one end of a connecting rod 48 which has its other end connected to the operating lever 49 of a valve 50 on the cold liquid supply pipe 45, the pipe 45 leading to the heater (not shown) which furnishes the source of hot liquid supplied through pipe 43, so that the float 46 will regulate and control the flow of liquid into the heater and consequently control the supply of hot liquid to the separating tank.

The operation of the several constructions shown is substantially the same and will be readily understood by those skilled in the art. Hot water or other liquid enters the separating tank through a spiral or helical conduit formed by the coils until it reaches a point where it is under little or no head. It is then discharged under extremely low pressure into the body of hot water within the tank. During the passage of the liquid through the spiral or helical conduit, the dissolved gases are thrown inwardly, due to centrifugal action and combine, forming small bodies or bubbles, which combine forming substantially an annular ring of larger bubbles around the body of liquid in the conduit which when discharged into the main body of water within the tank will break, and the dissolved gases escape through the vent openings in the upper end of the tank.

In the constructions of Figs. 5 and 7, the gases are drawn from the upper portion of the tank by the vacuum producing device.

In the apparatus of Fig. 7, the conduit 36 has a rough surface due to it being formed of cast metal, thus materially aiding in collecting and forming larger bodies or bubbles of gases. The cast metal conduit also will be more resistant to corrosion than the coils formed of pipe, due to the greater thickness of its walls and materials used in making the conduit.

Where water or other liquid above a certain temperature is introduced into a tank by means of the ordinary inlet pipe entering either above or below the water level; the dissolved gases in the liquid form a fine mist of bubbles, which do not readily separate from the liquid, unless the latter is maintained substantially without agitation. As the inflow and outflow of the liquid tends to keep the liquid in the tank agitated, it is not ordinarily possible for the liquid to be undisturbed. If liquid, free from dissolved gases is desired, it therefore follows that the liquid cannot be introduced into the tank and drawn therefrom continuously; and that a considerable time must be allowed for the liquid to settle, and for the gases to separate from it, between the time of introduction of water into the tank and time of its withdrawal therefrom, and even then the separation is not complete.

With the use of the devices of this invention, it is not necessary to permit any time interval for settling the liquid, and separation of the gases, which form in small bodies or bubbles, since the bodies of gases or bubbles will form into larger bodies or bubbles during the passage of the liquid through the coil or spiral conduits, and such bodies break instantaneously at the surface of the liquid in the tank.

I claim:—

1. In an apparatus of the class described a tank having inlet and outlet connections and a gas escape vent, a helical conduit connected with said inlet connection, and arranged to deliver the liquid into said tank at approximately the water level, to thereby collect the dissolved gases during the passage of the liquid through said conduit and to discharge said gases at approximately the liquid level so that they will escape through said escape vent.

2. The combination with a tank of the class described having an inlet connection for hot liquid adjacent its lower end, an outlet adjacent its lower end, and an escape vent adjacent its upper end above the liquid level, of a helical conduit connected with said inlet connection and extending upwardly to, and terminating at, approximately the liquid level in said tank, whereby the dissolved gases are collected from the hot liquid entering said tank during the passage of the liquid through said conduit and formed into bodies or bubbles, said gases being delivered into the main body of liquid at approximately its level, and allowed to escape through said vent.

3. The combination with a tank of the class described having an inlet connection for hot water adjacent its lower end, an outlet adjacent its lower end, and an escape vent, of at least one helical conduit connected with said inlet connection and extending upwardly to, and terminating at, approximately the water level in said tank, whereby the dissolved gases in the hot water are collected during its passage through said conduit in the form of large bubbles and discharged at approximately the water level, where they break and the gases escape through said vent, and means for controlling the flow of water into said tank to supply a constant level therein.

4. The combination with a tank of the class described having an inlet connection for hot water adjacent its lower end, an outlet adjacent its lower end, and an escape vent, of at least one helical conduit angular in cross section and having a roughened interior surface connected with said inlet connection, said conduit extending upwardly to, and terminating at, approximately the water level in said tank, whereby the dissolved gases in the hot water are collected during its passages through said conduit in the form of large bubbles and discharged at approximately the water level where the gases are discharged and escape through said vent, and means for controlling the flow of water into said tank to supply a constant water level therein.

5. The combination with a tank of the class described having an inlet connection for hot liquid adjacent its lower end, and an outlet adjacent its lower end, of means for separating and removing gases in suspension in said liquid by differential pressure during circulation of the liquid within said tank.

In testimony whereof I have hereunto signed my name.

JOHN J. WILSON.